Patented May 5, 1953

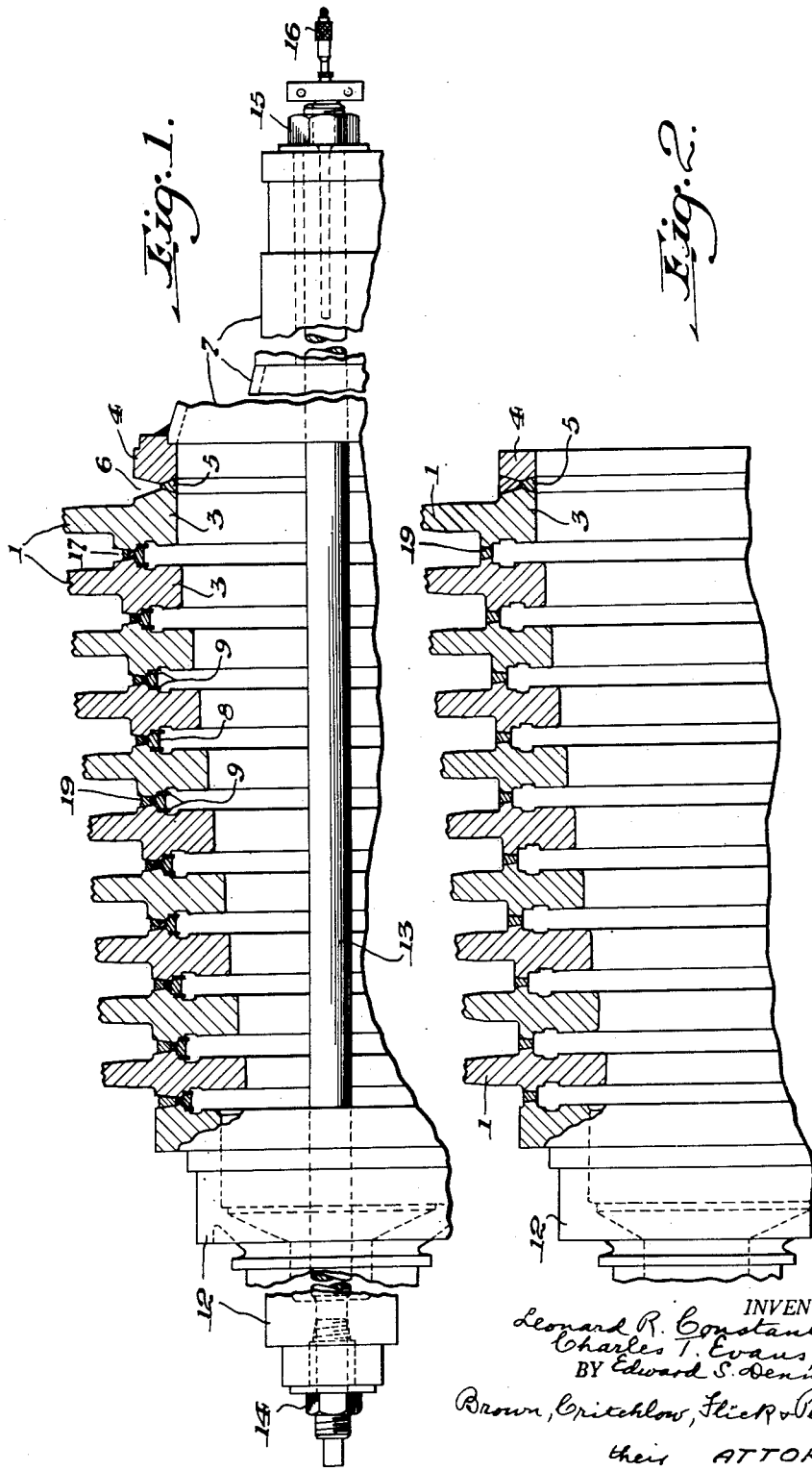

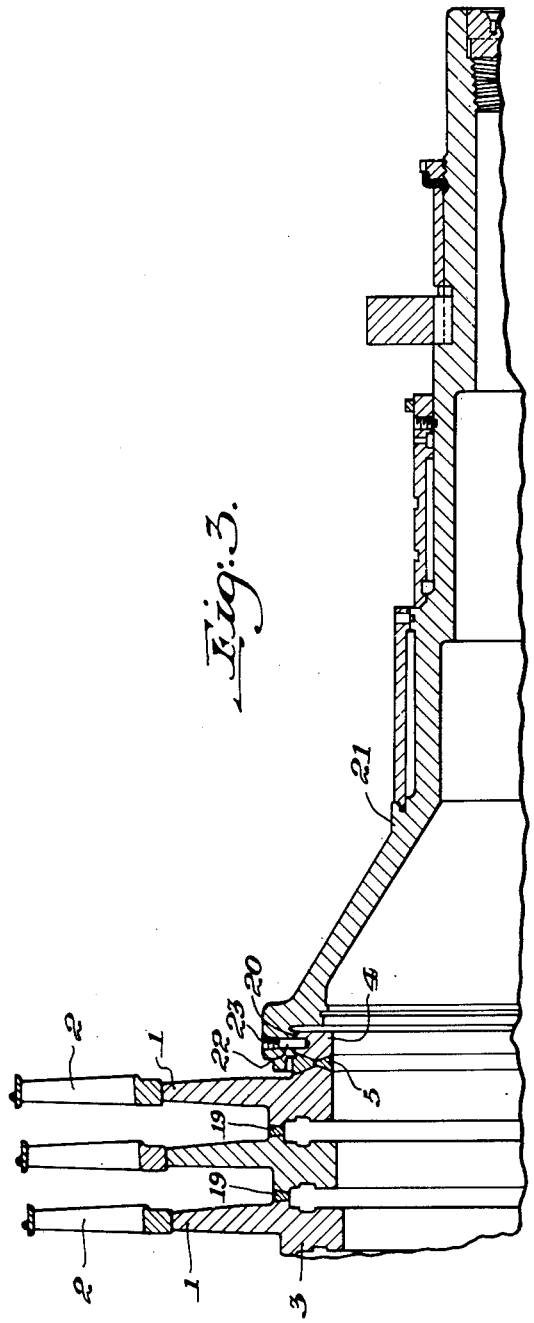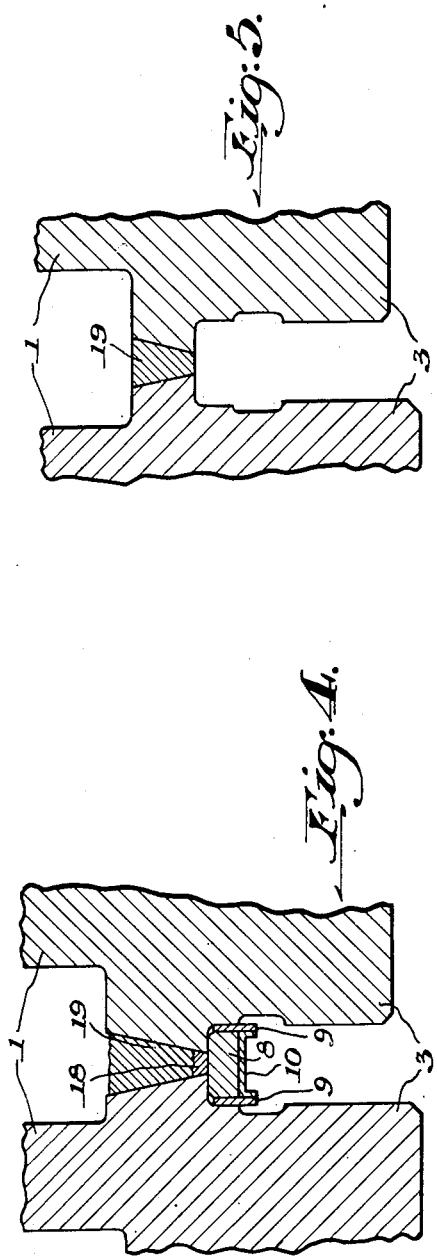

2,637,521

UNITED STATES PATENT OFFICE 2,637,521

GAS TURBINE ROTOR AND METHOD OF WELDING ROTOR DISKS TOGETHER

Leonard R. Constantine, Greensburg, Charles T. Evans, Jr., Delmont, and Edward S. Dennison, Hempfield Township, Westmoreland County, Pa., assignors to Elliott Company, Jeannette, Pa., a corporation of Pennsylvania Application March 1, 1949, Serial No. 79,004

3 Claims. (Cl. 253—69)

This invention relates to gas turbine rotors and to a method of making them.

Successful operation of gas turbines at high temperatures requires the use of special heat resisting alloys which have extremely high strength at high temperatures. As it is very difficult to obtain large forgings of such material it is desirable to construct large gas turbine rotors from individual metal discs welded side by side between stub shafts. In order to match the strength, oxidation, and expansion characteristics of the disc metal in a built-up rotor, it is desirable to use weld metal of the same or similar chemical analysis. If a softer or more ductile welding metal is used, the welds cannot be stress relieved because the welds will have a different coefficient of expansion than the metal discs. It is not practical to weld from the inside of such a rotor, so a single sided weld construction must be used. However, it is known that single sided welds tend to contain incipient cracks or notches in their roots, and that the relatively brittle heat resisting alloys suitable for gas turbine rotors are especially inclined to weld cracking. The cracks produced at the roots of the welds made with these materials are likely to extend vertically nearly through the welds, and in any case far beyond any reasonable amount which could be removed by machining the inside of the welds. In gas turbine rotors such flaws cannot be tolerated because the weight of the rotor, plus rotation, produces a fatiguing action which promotes progression of the flaws to failure.

It is among the objects of this invention to provide a method of welding gas turbine rotor discs together in which cracking of the welds is controlled, and in which the weld cracks can be removed by machining. Another object is to provide a gas turbine built-up rotor in which the discs are connected by crack-free welding metal having substantially the same composition as the disc metal, and in which at some point in its construction the welds have root portions of metal materially more ductile than the overlying weld metal.

In accordance with this invention a pair of turbine rotor annular discs are placed side by side with an inwardly tapered annular groove between them which is closed at its inner side by a backup ring. These discs may be held between stub shafts. A root pass is made in the groove around the backup ring with a weld metal that is materially more ductile than the disc metal. Succeeding passes are made in the groove with a weld metal of substantially the same composition as the disc metal. As a result, incipient cracks between the weld and the backup ring will occur only in the ductile metal of the root pass. In most, but not necessarily all, cases the backup ring and the ductile metal of the root pass are bored out to remove the cracks so that there will be no danger of their spreading into the harder overlying weld metal. The boring out may be accomplished by first removing one of the stub shafts to gain access to the interior of the rotor. The same or another similar shaft can be reattached to the end of the rotor after the interior machining has been completed. Although the backup ring may be an integral part of a disc, it is preferred to use a separate backup ring. This ring may be placed between two annular shrink strips which engage the sides of the discs and which are crushed when the weld shrinks and draws the discs toward each other. It also is preferred to preheat the assembled discs to a temperature between 850° and 1000° F. before welding.

The invention is illustrated in the accompanying drawings, in which Fig. 1 is a fragmentary side view of our rotor with the central portion shown in longitudinal section and with the welds shown in different stages of completion for illustrative purposes; Fig. 2 is a view similar to Fig. 1 with the right-hand stub shaft removed and the welds machined inside and out; Fig. 3 is a fragmentary longitudinal section through the right-hand end of the finished rotor; Fig. 4 is an enlarged cross section of a weld around a backup ring; and Fig. 5 is a similar view of the weld after it has been bored inside and machined outside.

Referring to the drawings, a series of rotor discs, of progressively greater diameters from the inlet end of the turbine to its exhaust end, are supported between hollow stub shafts. These discs are made of an alloy having extremely high strength at the high temperatures at which gas turbines are operated. A typical analysis of such an alloy is carbon 0.45, manganese 1.50, silicon 0.65, sulphur 0.02, chromium 20.00, phosphorus 0.02, nickel 20.00, cobalt 20.00, molybdenum 4.00, columbium 4.00, tungsten 4.00 and the balance iron. Each disc has an annular portion 1 from which turbine blades 2 (Fig. 3) project radially and which encircles a thick hollow hub 3 integral with it. Before the discs are assembled for welding, the largest or last disc at the exhaust end of the rotor is placed against a metal ring 4. These two members are shaped so that at the joint between them there is an inside tapered groove in which weld metal 5 then is deposited for welding them together. An inwardly tapered outside groove 6 (Fig. 1) then is machined around this weld, after which the outer end of the ring is welded to the inner end of a temporarly hollow stub shaft 7.

As best shown in Fig. 4, each of a plurality of backup rings 8, made of any easily machinable metal, is placed between a different pair of thin shrink strips or rings 9 which are made of copper, nickel or other low strength metal. The backup ring projects a short distance beyond the outer edges of the shrink rings and has beveled outer edges, so that the three rings will not have their outer edges forced into the adjacent corners of the disc hubs when the weld between the hubs shrinks. The shrink rings project from the inside of the backup ring, and the assembly is held together by means of clips 10 extending across the inner surface of the backup ring and soldered to the inwardly projecting portions of the shrink rings. These assemblies have different diameters for fitting between the different discs. The shrink rings yield and become crushed during welding and thereby reduce the magnitude of shrinkage forces exerted on the weld and adjoining disc material.

The rotor discs, with the backup rings between them, are stacked between the exhaust end disc and a hollow inlet stub shaft 12. The backup rings 8 space the discs the desired distances apart, and assure accurate alignment of the discs before welding, as well as proper construction of the first welding pass, called the root pass. The shafts and discs and rings are held tightly together by means of a through bolt 13 extending through all of them and having nuts 14 and 15 screwed on its opposite ends to place the rod under tension, which can be measured by a depth micrometer 16 extending into an axial bore in one end of the bolt. The sides of the disc hubs 3 around the backup rings are so shaped and spaced as to provide inwardly tapered annular grooves 17 encircling the rings. The inner sides or bottoms of the grooves are closed by the backup rings. This rigid assembly is preheated to a temperature between 850° and 1000° F.

The next step is to weld the discs together and to the inlet stub shaft 12, as well as to weld in groove 6 between end ring 4 and the adjoining disc. The first or root pass 18 of each weld is made with metal which is considerably more ductile than the extremely hard metal of the discs. We have found an excellent alloy for the root pass to have the following analysis; carbon 0.10, manganese 4.00, silicon 0.50, chromium 19.50, nickel 9.75, sulphur 0.02, phosphorus 0.02, molybdenum 0.75 and the balance iron.

The root pass generally will be about ⅛ of an inch thick. The rest of the passes forming the weld are made from weld metal 19 having the same, or substantially the same, composition as the metal forming the discs. That is, it should have substantially the same strength, oxidation and expansion characteristics as the disc metal. After all of the grooves have received the first pass using the hard welding metal, the tension on the belt 13 is released. Then enough succeeding passes are made to fill grooves 17 and complete the welds. This is followed by removing the through bolt and heating the rotor to stress-relieve the welds. If any incipient cracks occur between the welds and the backup rings they will occur in the ductile root passes 18 of the welds.

If the welds are deep enough, the soft root passes will be under compression because the subsequent passes of harder weld metal shrink on the root passes and also draw the discs toward one another. With the softer root passes under compression, the cracks in them will not spread if the rotor does not become so hot as to cause the compressed weld metal to creep, and put itself under tension. When it is known that service conditions will be such that the cracked portions of the welds will remain under compression, it is only necessary to machine the outside of the welds and the adjoining portions of the hubs.

To be on the safe side, however, it is preferred in most cases to remove the ductile weld metal or root passes 18 so that the cracks therein will be removed before they can spread into the overlying hard weld metal 19. In order to do this the rotor is chucked on the temporary exhaust shaft 7 and steady-rested on the cylindrical inner end of the inlet shaft 12. The outer surface of the end ring 4 and the outside of the weld connecting it to the adjoining disc then are machined. Following this the rotor is chucked on the inlet shaft and steady-rested on the machined outer surface of end ring 4. Then the outer end of the end ring is cut off to remove the temporary shaft 7 from the ring, leaving the rotor with only one shaft as shown in Fig. 2. The outside of the various welds then is machined while the backup rings and the inside of the welds are being bored out. The boring tools can be inserted from the open exhaust end of the rotor. Preferably, each entire backup ring 8 and its adjoining shrink rings 9 are removed in this manner, and most or all of the ductile root pass 18 of each weld likewise is removed along with a little of the overlying weld metal 19. This removes all the cracks that were present in the root passes, leaving the discs connected only by the hard uncracked weld metal 19 that has the same characteristics as the disc metal, as shown in Figs. 2 and 5.

A plug (not shown) then is fitted in the open end of the rotor and supported on a live center so that a thread 20 (Fig. 3) can be cut in the outer surface of end ring 4. An exhaust stub shaft 21 is provided with an inside thread that is dimensioned to have an interference fit with thread 20 on the end ring. The shaft therefore is heated to expand it sufficiently to permit it to be screwed onto the end ring, and the joint becomes a threaded shrink fit. The stub shaft is locked in place by radial pins 22 inserted in radial bores drilled in the shaft and end ring. The pins are held in place by set screws 23. After some minor operations on the rotor and the setting of the blades 2 in the discs, the rotor is completed and ready for use.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of welding together a pair of gas turbine rotor annular discs made of a brittle alloy having extremely great strength at gas turbine operating temperatures, comprising placing the discs side by side with an inwardly tapered annular groove between them closed at its inner side by a backup ring, making a root pass in the groove around the ring with a weld metal that is of different composition and materially more ductile than the disc metal, making succeeding passes with a weld metal of substantially the same composition as the disc metal, whereby incipient cracks between the weld and the backup ring will be restricted to said ductile metal, and boring out said ductile metal and the underlying backup ring metal.

2. The method of welding together a series of annular gas turbine rotor discs made of a brittle alloy having extremely great strength at gas turbine operating temperatures, comprising placing them side by side between a pair of stub shafts, spacing the discs apart by separate backing rings that form the inner walls of inwardly tapered annular grooves between the discs, making a root pass in each groove around the underlying back-up ring with a weld metal that is of different composition and materially more ductile than the disc metal, making succeeding passes in the grooves with a weld metal of substantially the same composition as the disc metal, removing one of said stub shafts from one end of said series of discs to expose the inside of said series, machining out said rings and ductile weld metal, and fastening a stub shaft to said one end of the series of discs.

3. A gas turbine rotor comprising a plurality of metal discs disposed side by side formed of a brittle alloy having extremely great strength at gas turbine operating temperatures, a metal backup ring between each pair of discs, and an annular weld encircling the ring and joined thereto and to the sides of the adjoining discs to weld them together, the root pass of the weld being a chromium-nickel stainless steel that is of different composition and materially more ductile than the disc metal, and the remainder of the weld being composed of brittle metal of substantially the same composition as the disc metal, at least the outer portion of said brittle weld metal being under shrinkage stress, whereby it is under tension, and said root pass being in a state of compressive stress imposed by the shrinkage of the weld around it, the ductility of the root pass metal being high enough to confine to the root pass incipient cracks therein at the backup ring as long as the root pass remains under compression.

LEONARD R. CONSTANTINE.
CHARLES T. EVANS, Jr.
EDWARD S. DENNISON.

References Cited in the file of this patent

UNITED STATES PATENTS

| Number | Name | Date |
| --- | --- | --- |
| 1,620,324 | Carter | Mar. 8, 1927 |
| 1,961,117 | Wall | May 29, 1934 |
| 1,966,241 | Furrer | July 10, 1934 |
| 2,141,021 | Rooke | Dec. 20, 1938 |
| 2,174,380 | Doran | Sept. 26, 1939 |
| 2,200,287 | Lysholm | May 14, 1940 |
| 2,249,723 | Orr | July 15, 1941 |
| 2,294,650 | Bechtle | Sept. 1, 1942 |
| 2,306,421 | Arness | Dec. 29, 1942 |
| 2,317,092 | Allen | Apr. 20, 1943 |
| 2,369,051 | Huber | Feb. 6, 1945 |
| 2,392,281 | Allen | Jan. 1, 1946 |
| 2,434,321 | Kleiner | Jan. 13, 1948 |
| 2,450,493 | Strub | Oct. 5, 1948 |